Feb. 23, 1960     C. D. GIBSON     2,925,887
MATERIAL HANDLING TRUCK

Filed Feb. 11, 1957     5 Sheets-Sheet 1

INVENTOR.
CHRISTIAN D. GIBSON
BY

Feb. 23, 1960     C. D. GIBSON     2,925,887
MATERIAL HANDLING TRUCK

Filed Feb. 11, 1957     5 Sheets-Sheet 3

INVENTOR.
CHRISTIAN D. GIBSON
BY

Feb. 23, 1960 C. D. GIBSON 2,925,887
MATERIAL HANDLING TRUCK
Filed Feb. 11, 1957 5 Sheets-Sheet 4

INVENTOR.
CHRISTIAN D. GIBSON

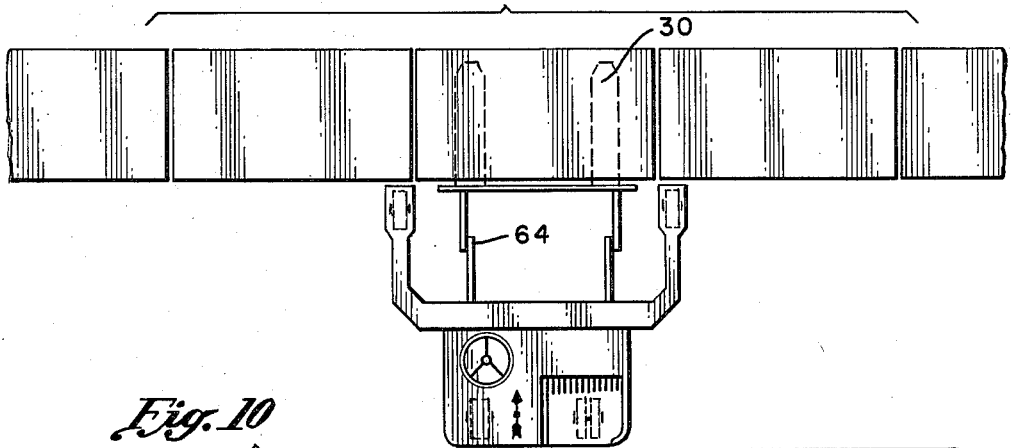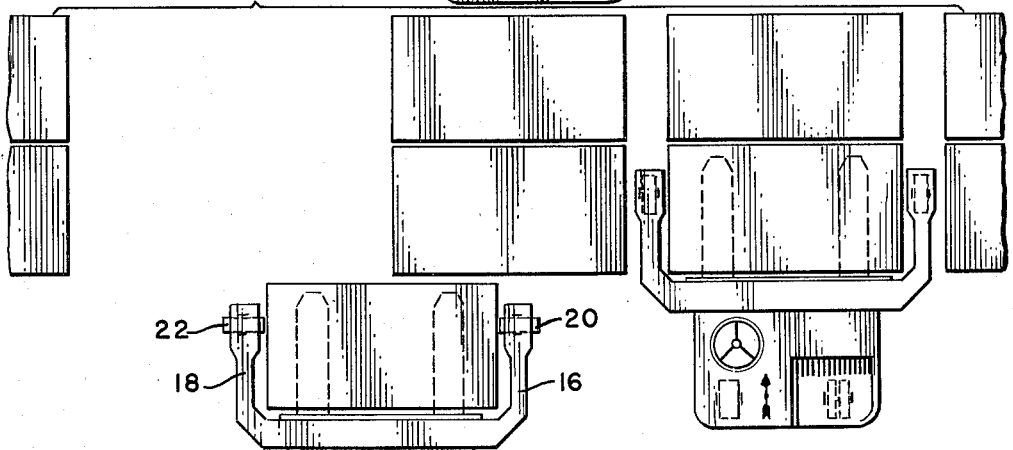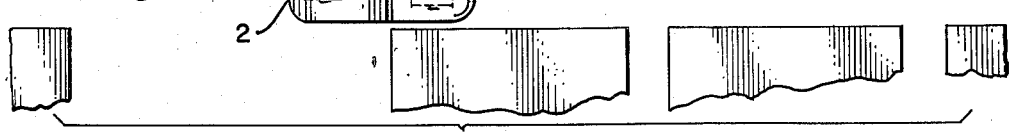

United States Patent Office 2,925,887
Patented Feb. 23, 1960

2,925,887

MATERIAL HANDLING TRUCK

Christian D. Gibson, Greene, N.Y., assignor to The Raymond Corporation, Greene, N.Y., a corporation of New York Application February 11, 1957, Serial No. 639,245

7 Claims. (Cl. 187—9)

This invention relates to material handling trucks and has for its general object such modification of the structure and design of existing trucks as to facilitate their use in the handling of loads of dimensions which are difficult to handle with existing trucks and aisle arrangements. More particularly the invention relates to a truck which, with a single, simple adjustment of one of its supporting wheels, may be driven with or without a load thereon in either one of two directions at right angles to each other, whereby a load of a length greater than aisle width may be transported lengthwise along the aisle by driving the truck in one of its driving directions and then by the aforementioned simple adjustment the truck may be converted into one that can be driven in a direction transverse to the first mentioned direction.

With the foregoing and other objects in view, the invention contemplates the provision of a truck having a motor-driven wheel swivel-mounted in the truck frame for steering and two wheel-supported outriggers having their supporting wheels substantially offset from said driving and steering wheel in one dimension and from each other in a transverse dimension, one outrigger supporting wheel being castered and the other being arranged to be swiveled into and to be locked in either of two planes of rotation parallel to the aforementioned dimensions.

Other objects of important features of the invention, to which reference has not been made hereinabove, will be apparent when the following description and claims were considered in connection with the accompanying drawings in which Figure 1 is a perspective view of a power-driven material handling truck embodying the present invention;

Figure 9 is a diagrammatic plan view showing the truck when used as a straddle base truck and with its wheels in position to insure movement of the truck lengthwise of the aisle in which it is shown.

Figure 10 shows the truck of Figure 9 with the wheels turned at right angles to the positions in which they are shown in Figure 9 and with the truck moved into base straddling relation to the tier on which its load is to be deposited.

Figure 11 is a similar plan view showing diagrammatically the truck provided with reach fork mechanism such as shown in U.S. Letters Patent No. 2,752,058, granted May 15, 1956 in which the tiers are so close together that the truck cannot be used as a straddle base truck.

Figure 1:
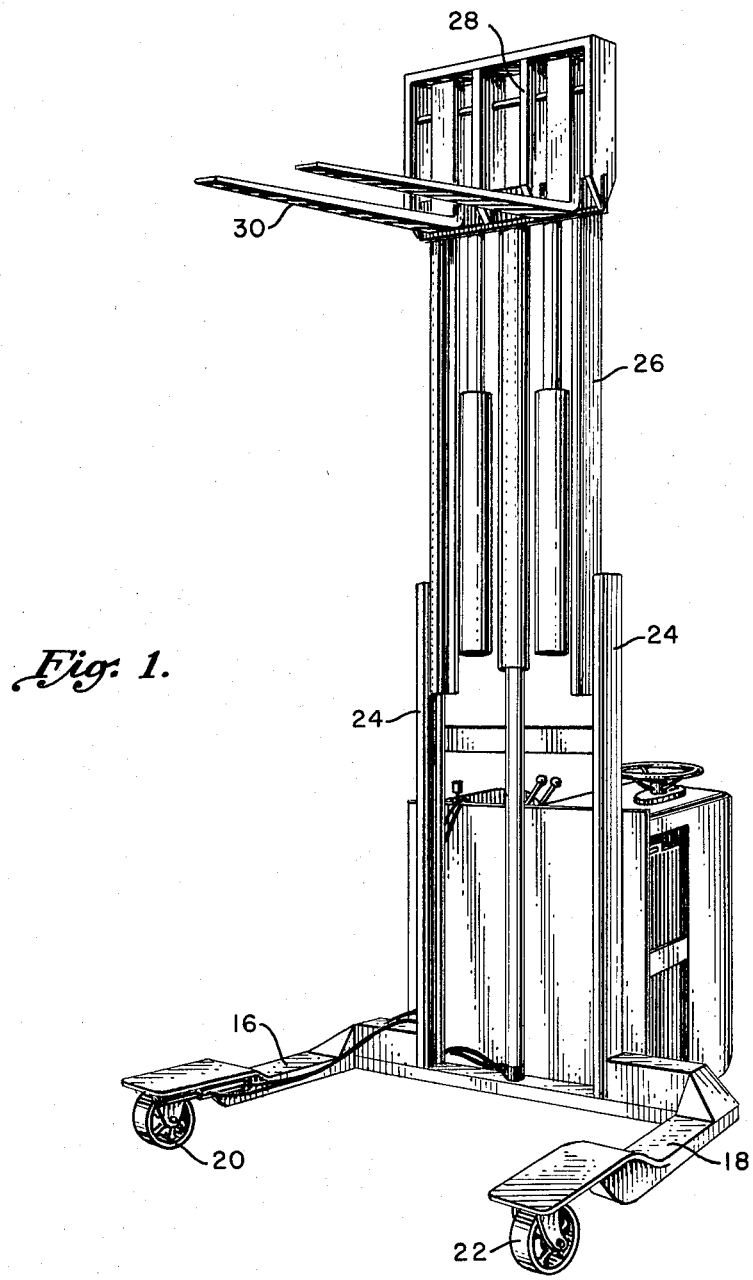

The embodiment of the invention shown in the drawings comprises automotive and load lifting mechanism such as shown in U.S. Letters Patent No. 2,264,002, granted August 14, 1951. Reference may be had to the aforesaid Letters Patent for a detailed description of the automotive, truck steering and load lifting mechanisms.

As pointed out in the patent just identified the truck comprises a motor-driven wheel 2, swivel-mounted in the frame 4 of the truck so that it may be used for steering. This steering is effected by means of a steering wheel 6 connected by a sprocket chain 8 to the turret or swivel 10 in which the driving or traction wheel 2 has its bearings.

The parts so far described are located on one side of an axis of symmetry and a stabilizing caster 12 is arranged to swivel in the frame beneath an operator's platform 14 so that it may follow appropriately the movements of the steering and driving wheel.

The frame 4 is provided with laterally spaced rearwardly extending wheel supported outriggers 16 and 18 which, as hereinabove suggested, have their supporting wheels 20 and 22 substantially offset from the driving and steering wheel 2 in one dimension and from each other in a transverse dimension. In other words, the outriggers have their supporting wheels located at a substantial distance behind the uprights 24, constituting the guides for the telescopable part 26 of the load lifting mechanism on which the fork carriage 28 is mounted, so as to provide stability to the truck, particularly when the load carrying forks 30 are in the high lift position shown in Figure 1.

Figure 2:
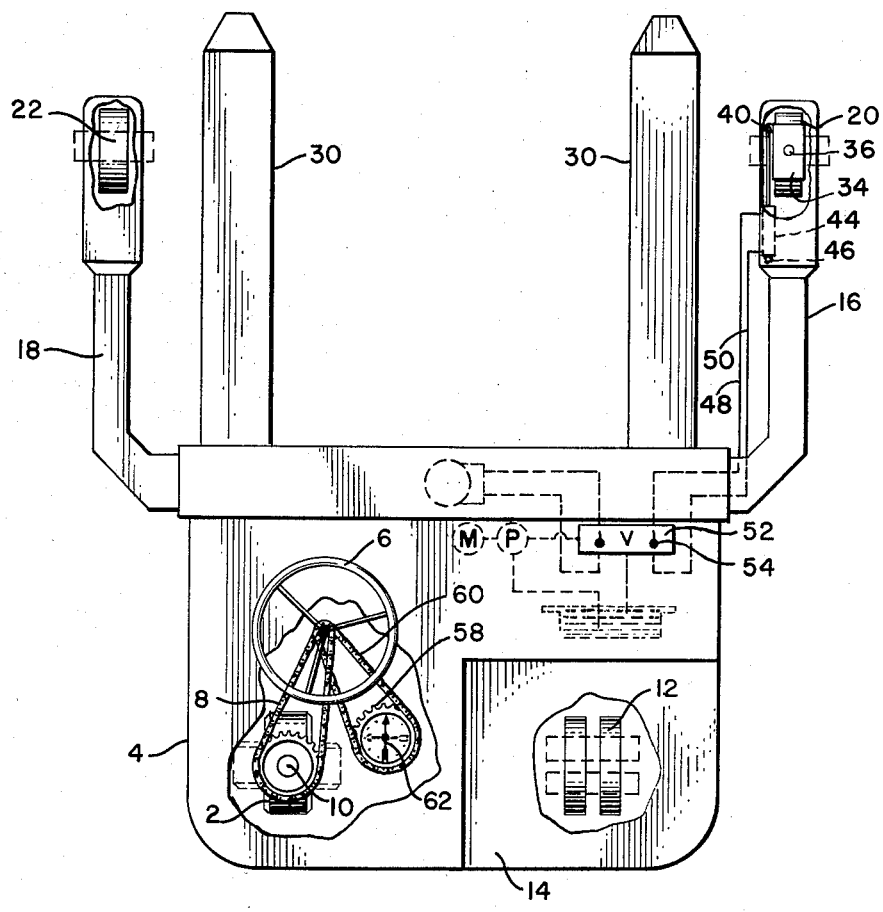
Figure 2 is a partially diagrammatic and partially plan view, with parts broken away of the truck shown in Figure 1.

It will be noted from an inspection of Figure 2 of the drawings that the axes about which the wheels 2 and 12 swivel are substantially in one plane and that the axes about which the wheels 20 and 22 swivel are substantially in another plane which is parallel to the plane in which the axes of the wheels 2 and 12 swivel.

It will further be noted that in the construction shown in Figure 2, which embodies the structure of the Letters Patent No. 2,264,002 hereinabove identified, it is advantageous for reasons hereinafter pointed out, to have the wheel 20 offset from the wheel 2 along the transverse dimension of the truck a greater distance than the wheel 22 is offset from said wheel 2. If instead of using the particular arrangement shown in Figure 2, that is the one embodying the structure of the Letters Patent above referred to, a driving wheel 2 be used without a stabilizing caster 12, the two outrigger wheels 20 and 22 might be equally offset from the driving wheel 2 along the transverse dimension of the truck.

Figure 7:
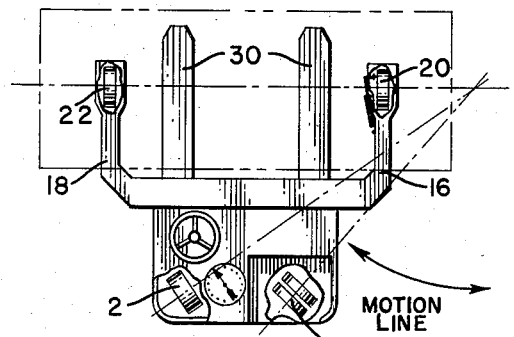
Figure 7 is a diagrammatic plan view showing the positions which the different wheels assume when the adjustable outrigger wheel is in the position illustrated in Figure 5 and turning of the truck is being effected.
Figure 8:
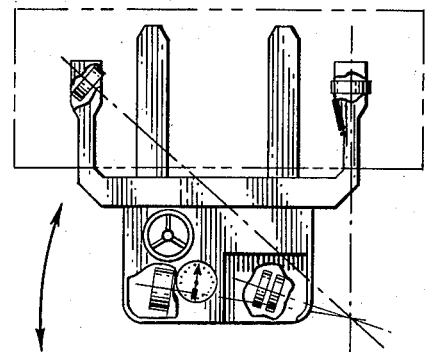
Figure 8 is a diagrammatic plan view showing the positions which the different wheels assume when the adjustable outrigger wheel is in the position shown in Figure 6 and the truck is being turned.

In the truck herein shown one of the outrigger supporting wheels, namely the wheel 22, is caster mounted in the outrigger 18, that is, the wheel is provided with a swivel which turns in the outrigger 18 and the axis on which the wheel itself turns is offset from the swivel axis to that the wheel 22 readily casters to accommodate itself to the steering movements of the wheel 2 as may be seen in Figures 7 and 8 of the drawings.

The other outrigger supporting wheel 20 is likewise swivel-mounted in the outrigger 16, but the axis of its swivel intersects the axis about which the wheel turns and the wheel itself is mechanically adjusted to travel in either one of two planes at right angles to each other. The wheel 20 thus serves, in either of its adjusted positions, as a tracking wheel which, in cooperation with the driving and steering wheel 2, helps determine the direction of movement of the truck. The purpose of this adjustability will be apparent from an examination of Figures 5 and 6 and 9, 10, and 11. If, for example, it is desired to pick up a relatively long load in a narrow aisle, the wheel 20 would be locked in the adjusted position shown in Figure 5 so that the truck could readily be moved into pick-up position. After the load has been picked up, the wheel 20 may then be adjusted into the position shown in Figure 6, the steering and driving wheel 2 turned into a like travelling position and the caster wheels 12 and 22 following, so that all the wheels are moved into the direction of travel shown in Figure 6, which permits the truck to travel down the aisle in a direction transverse to its pick-up direction of movement but lengthwise of the load.

Figure 3:
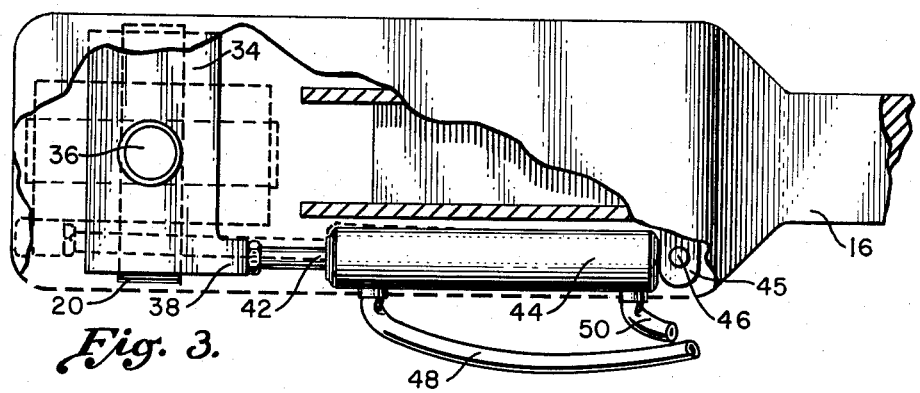
Figure 3 is a detail plan view, with parts broken away, of one of the outriggers, this view showing the hydraulic connections for swiveling one of the outrigger wheels into and locking it in either one of two planes of rotation at right angles to each other.
Figure 4:
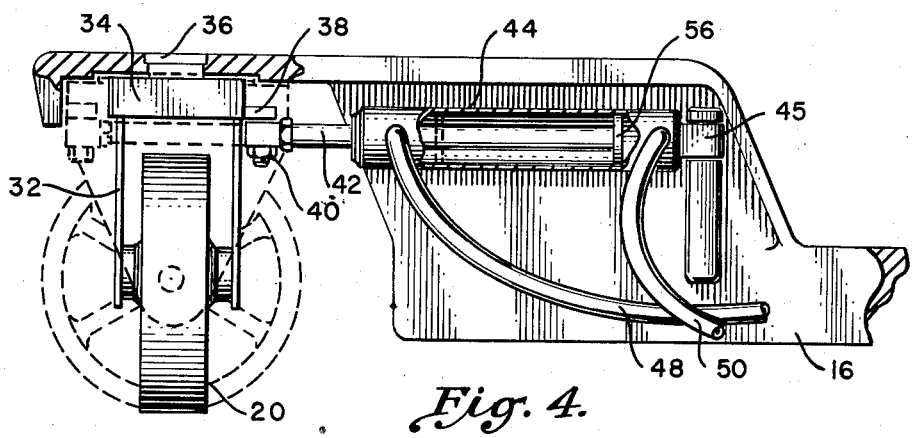
Figure 4 is a side elevation, partly in section, of the structure shown in Figure 3.

Provision is made for quick and easy swiveling of the wheel 20 into either of its adjusted relations to the outrigger 16, whereby the operator can bring about such adjustment through control means conveniently located near his station on the platform 14. In the illustrative embodiment of the invention, the wheel 20 is shown as having its bearings in a fork 32 depending from a swivel plate 34 swiveled at 36 in the hollow outer end of the outrigger 16, the swivel plate 34 being provided with a short arm or lug 38 from which depends a crank pin 40 received in a suitable hole in the end of the jack piston rod 42 constituting the movable part of a two-way jack having a cylinder 44 provided with an integral eye 45 mounted to swing on a pin 46 received in openings in upper and lower spaced lugs 47 and 49 carried by the outrigger 16. The jack is adapted to swing plate 34 and with it the wheel supporting fork 32 on its swivel bearing 36 from the position shown in full lines in Figures 3 and 4 to the position shown in dotted lines in said figures, and vice versa, these two positions being at right angles to each other and corresponding, respectively to the positions shown in Figures 5 and 6. It will be seen that tubes 48 and 50 provide hydraulic connections to the control valve 52, operable by the lever 54, and that when hydraulic fluid is introduced behind the piston 56, as it is shown in Figure 4, the plate 34 and wheel 20 will be swiveled into the position shown in dotted lines in Figures 3 and 4 and so long as the hydraulic pressure is maintained behind the piston 56 the wheel will be locked in this position.

To facilitate proper adjustment of the supporting wheels into either of their two positions of normal travel an indicator is provided adjacent to the operator's station which indicates the position of the driving and steering wheel 2. This indicator is shown in Figure 2 and comprises a sprocket wheel 58 mounted on a suitable shaft and driven by a sprocket chain 60 from another sprocket wheel on the shaft of the steering wheel 6. A pointer 62 on or connected to the sprocket wheel 58 will indicate, as shown, whether the driving and steering wheel 2 has been turned into a position to move the truck in the direction shown in Figure 5 or whether it has been set to move the truck in the direction shown in Figure 6. When, for example, the operator desires to cause the truck to travel in one of the directions shown in Figure 5, that is, in the direction of the length of the truck, he will operate the mechanism which places the supporting wheel 20 on the outrigger 16 in the plane of rotation shown in Figure 5 and at the same time be sure that the pointer 62 is pointing in the direction shown in Figure 5 and also shown in full lines in Figure 2, this direction corresponding with the direction of the steering wheel shown in Figure 2 in full lines and also in Figure 5.

Figure 5:
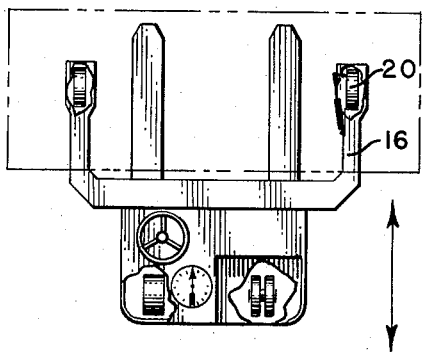
Figure 5 is a diagrammatic plan view showing the positions of the wheels of the truck when it is in position either to pick up or deposit a load.
Figure 6:
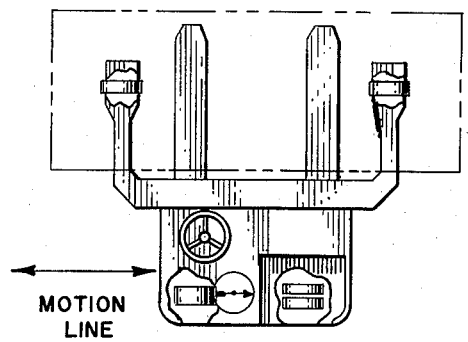
Figure 6 is a diagrammatic plan view similar to Figure 5 showing the positions of the wheels when the truck is moving or is about to move the load along an aisle in which it is to be stacked or stored or from the side of which it has just been picked up.

After the operator has picked up a load, as shown in Figure 5, which is of a length too great to be handled conveniently in the ordinary warehouse or factory aisle, the operator can, instead of turning the truck to carry the load with its greater dimension crosswise of the aisle, set the wheels by means of the adjusting mechanism hereinabove described, into the position to permit the truck to carry the load in the manner shown in Figure 6, that is, with the greater dimension of the load lengthwise of the aisle and the truck travelling in a direction corresponding to its transverse dimension.

In Figure 11 is shown, somewhat diagrammatically, a modification of the truck to permit it to pick up a load from a rack or tier extending along-side an aisle without the necessity for the fork base of the truck, that is, the outriggers having to go in between the tiers or beneath a rack. In this modification there is incorporated in the truck the means for projecting and retracting the load carrying forks 30 which are shown in U.S. Letters Patent No. 2,752,058, granted May 15, 1956. Since the aforementioned patent shows the means for projecting and retracting the load carrying fork 30, incorporated in a truck structure having automotive and load handling means such as shown in Figure 1, it is not necessary here to describe this modification in detail, reference being had to the said Letters Patent for a more complete description of this mechanism. The linkage which is fully shown and described in the said Letters Patent is herein shown merely diagrammatically and designated by the reference numeral 64.

From the foregoing description it will be seen that the truck of the present invention provides efficient and easily operable means for handling loads of dimensions which prevent their convenient handling by existing material handling trucks in ordinary factory and warehouse aisles.

What is claimed as new is:

1. A material handling truck having, in combination, a frame, a motor-driven wheel swivel-mounted in said frame for steering, said frame comprising also two wheel-supported outriggers extending rearwardly from said motor driven wheel and said outriggers having their supporting wheels substantially offset and away from said driving and steering wheel in one dimension and from each other in a transverse dimension, one of said outrigger supporting wheels being castered and the other being arranged to be swivelled into and to be locked in either of two planes of rotation parallel to the aforementioned dimensions.

2. A material handling truck according to claim 1 in which load pick-up and carrying means are arranged to carry the picked-up load with its vertically projected center of gravity within the truck wheel base.

3. A material handling truck according to claim 1 in which a fourth frame supporting and stabilizing wheel is caster-mounted in the frame with its swivel axis in a plane, including the steering swivel axis, which is subtially parallel to a plane in which the swivel axes of the outrigger supporting wheels are located.

4. A material handling truck according to claim 1 in a two-way hydraulic jack mounted on the associated outrigger and having its piston rod crank-connected to the supporting wheel swivel serves both to effect the swiveling of said wheel into and to lock it in either of its two planes of rotation.

5. A material handling truck according to claim 1 in which the outrigger supporting wheel which can be locked in either of two transverse planes of rotation is also offset a substantial oblique distance from the motor-driven wheel.

6. A material handling truck according to claim 1 in which load pickup and carrying means are arranged to carry the picked up load with its vertically projected center of gravity in the region about the truck wheel base.

7. A material handling truck having a frame, a motor driven wheel for steering and said wheel being swivel mounted in said frame, said frame having outriggers extending therefrom and away from said steering wheel, supporting wheels on the outer portions of each of said outriggers, one of said supporting wheels being castered and free turning, the other outrigger supporting wheel being arranged to be swivelled into and to be locked in either of two planes of rotation, hydraulic means for locking said second supporting wheel in position, a stabilizing caster wheel swivel mounted on said frame and cooperating with said steering wheel and said outrigger supporting wheels whereby a four wheel supporting system is provided for said material handling truck.

References Cited in the file of this patent

UNITED STATES PATENTS

| | | |
|---|---|---|
| 1,584,517 | Dinkelberg | May 11, 1926 |
| 1,804,541 | Perin | May 12, 1931 |
| 1,828,905 | Mossay | Oct. 27, 1931 |
| 2,582,000 | Bloomstran | Jan. 8, 1952 |
| 2,678,746 | Gibson | May 18, 1954 |